(12) United States Patent
Ito et al.

(10) Patent No.: US 9,420,750 B2
(45) Date of Patent: Aug. 23, 2016

(54) WALL-SURFACE FLOWER BED STRUCTURE AND METHOD FOR FORMING WALL-SURFACE FLOWER BED

(71) Applicants: Takami Ito, Aichi (JP); Erika Miyazaki, Osaka (JP); Mitsuyo Ookawa, Hiroshima (JP)

(72) Inventors: Takami Ito, Aichi (JP); Erika Miyazaki, Osaka (JP); Mitsuyo Ookawa, Hiroshima (JP)

( * ) Notice: Subject to any disclaimer, the term of this patent is extended or adjusted under 35 U.S.C. 154(b) by 0 days.

(21) Appl. No.: 14/426,732

(22) PCT Filed: May 15, 2013

(86) PCT No.: PCT/JP2013/063522
§ 371 (c)(1),
(2) Date: Mar. 7, 2015

(87) PCT Pub. No.: WO2014/041850
PCT Pub. Date: Mar. 20, 2014

(65) Prior Publication Data
US 2015/0230412 A1    Aug. 20, 2015

(30) Foreign Application Priority Data

Sep. 12, 2012   (JP) .................................. 2012-200906

(51) Int. Cl.
*A01G 9/02* (2006.01)
*A01G 27/00* (2006.01)

(52) U.S. Cl.
CPC ................ *A01G 9/02* (2013.01); *A01G 27/005* (2013.01)

(58) Field of Classification Search
CPC ..................... A01G 9/02; A01G 9/022–9/025; A01G 9/027; A01G 9/028; A01G 9/104; A01G 9/1066; A01G 27/005; A01G 27/04; A01G 27/06
USPC .......................... 47/33, 65.5, 65.7–65.9, 66.1, 47/66.5–66.7, 67, 79–83, 86, 39, 44, 46, 47/48.5, 58.1 R IPC ................ A01G 9/02,9/10, 27/00, 27/04, 27/06
See application file for complete search history.

(56) References Cited

U.S. PATENT DOCUMENTS 2,659,180 A * 11/1953 Acton .................... A01G 27/04
  47/39
3,990,179 A * 11/1976 Johnson .................. A01G 9/02
  206/423

(Continued)

FOREIGN PATENT DOCUMENTS

JP         4-20198       5/1992
JP       2006-034114     2/2006

(Continued)

OTHER PUBLICATIONS

Australian Office Action for corresponding Australian Application No. 2013317172 issued on Jun. 1, 2013.

(Continued)

*Primary Examiner* — Lisa Tsang
(74) *Attorney, Agent, or Firm* — Renner, Otto, Boisselle & Sklar, LLP (57) ABSTRACT

The present invention is a wall-surface flower bed structure, wherein work efficiency is better, root damage when plants are transferred is prevented, and the designability of the wall-surface flower bed is improving. This wall-surface flower bed structure (1) is provided with: a plant-holding pot (4) for holding a plant, a plurality of through holes for water passage being formed in a bottom surface and side surface thereof, and the root section of the plant being covered with a water-permeable material (3) that allows permeation of water; and a box body (2) that has an opened upper surface and has an inclined section (2a) for the placement of a plurality of the plant-holding pot (4), a water-collecting section (2b) for collecting water at the lower end side of the inclined section (2a), and a water outlet for discharging water that is not collected in the water-collecting section (2b). This configuration makes it possible for work efficiency to be better, root damage when plants are transferred to be prevented, and the designability to be improved in the wall-surface flower pot structure (1).

10 Claims, 10 Drawing Sheets

(56) References Cited

U.S. PATENT DOCUMENTS

| | | | | |
|---|---|---|---|---|
| 4,142,324 | A * | 3/1979 | Magyar, Jr. | A01G 9/10 47/75 |
| 4,255,896 | A * | 3/1981 | Carl | A01G 31/06 47/62 C |
| 4,546,571 | A * | 10/1985 | Scrivens | A01G 27/04 47/64 |
| 4,592,166 | A * | 6/1986 | Tendrup | A01G 9/024 47/67 |
| 5,367,823 | A * | 11/1994 | Ferris | A47G 7/041 47/39 |
| 6,266,921 | B1 * | 7/2001 | Keskilohko | A01G 9/104 47/86 |
| D485,207 | S * | 1/2004 | Dion | D11/143 |
| 7,854,091 | B1 * | 12/2010 | Chang | A01G 27/04 47/81 |
| 2010/0146855 | A1 | 6/2010 | Ma | |
| 2011/0094153 | A1 | 4/2011 | Urriola | |
| 2011/0113685 | A1 * | 5/2011 | Chang | A01G 9/025 47/39 |
| 2011/0192084 | A1 * | 8/2011 | MacKenzie | A01G 9/025 47/83 |
| 2011/0258925 | A1 * | 10/2011 | Baker | A01G 9/023 47/65.8 |
| 2012/0186148 | A1 * | 7/2012 | Chang | A01G 9/025 47/41.01 |
| 2014/0075840 | A1 * | 3/2014 | Gosling | A01G 9/025 47/81 |

FOREIGN PATENT DOCUMENTS

| | | |
|---|---|---|
| JP | 2006-129842 | 5/2006 |
| JP | 2011-229465 | 11/2011 |
| JP | 2012-060942 | 3/2012 |
| JP | 2012-110234 | 6/2012 |
| KR | 10-2011-0136304 | 12/2011 |

OTHER PUBLICATIONS

International Search Report for corresponding International Application No. PCT/JP2013/063522 mailed Jun. 18, 2013.
"Green Wall System Platico", http://www.itoshoji.co.jp/platico/index.html downloaded Mar. 6, 2015.
Japanese Decision to Grant with translation to corresponding Japanese Application No. 2012-200906 mailed Feb. 9, 2013.
Japanese Notification of Reasons of Refusal with translation to corresponding Japanese Application No. 2012-200906 mailed Nov. 27, 2012.
Korean Office Action dated Feb. 11, 2016 for corresponding Korean Application No. 10-2015-7009060.

* cited by examiner

WALL-SURFACE FLOWER BED STRUCTURE AND METHOD FOR FORMING WALL-SURFACE FLOWER BED

BACKGROUND OF THE INVENTION

1. Field of the Invention

The present invention relates to a wall-surface flower bed structure, which is attached to wall-surface of buildings or wall-surface of architectures and makes wall-surface green, as well as a method for forming wall-surface flower bed utilizing the wall-surface flower bed structure.

2. Description of the Related Art

These days, a wall-surface greening, which is located along wall-surface of buildings or wall-surface of architectures, is becoming popular. This wall-surface greening has lots of effects, such as healing and relaxation being surrounded by the green, not to mention, an energy-saving effect, which can avoid increasing room temperature in summer and decreasing heat escaping in winter. Therefore, it is predicted that a wall-surface greening will become more popular in the future.

A variety of wall-surface flower bed structures have already been disclosed, for example, an apparatus, in which a user can plant many plants and which is attached to a wall-surface vertically, is disclosed as a wall-surface greening apparatus (refer to official publication of Japanese Laid-Open Patent Application No. 2011-229465).

Furthermore, a wall-surface greening system, which has many planters along wall-surfaces, is also disclosed (refer to official publication of Japanese Laid-Open Patent Application No. 2012-60942). Herein, planters are detachable and therefore operable to change their positions freely.

Moreover, a flower bed, which has a plurality of wall-surface panel, is disclosed as a wall-surface greening flower bed (refer to official publication of Japanese utility model registration No. 1953528), wherein each panel includes through holes having a certain size. Such technology can also be applied to a cassette type wall surface greening system, which has many joint panels being attached to wall-surface, and each joint panel has a plural of through holes for holding plant pots (refer to "A cassette type wall-surface greening system" available at www.itoshoji.co.jp, for example).

Furthermore, a system, which comprises wall-surface panels having a plural of through holes, is disclosed as a wall surface greening system (refer to "A wall surface greening system" available at www.suntory.co.jp, for example), wherein the root section of plants is covered with a water-permeable material that allows permeation of water.

BRIEF SUMMARY OF THE INVENTION

However, in the method of the wall-surface greening apparatus described above, the planters need to be filled with potting composts or pumice stone, subsequently, the planters are attached to wall-surface. In this case, operations at high place are often required, and such operations are dangerous and inefficient, not to mention, it takes long time when operators replace old plants or potting composts with new ones.

In addition, in the method of the wall-surface greening system described above, there may be root damages when plants are transplanted. In this case, it takes long time for the plants to recover from the root damages, so that the appearance of the wall-surface flower bed is ruined, because of growth rate gap between normal plants and root-damaged plants.

In addition, in the wall surface greening panels having a plurality of through holes described above, positions where plant pots are inserted are fixed beforehand. Therefore, although such wall surface greening panels are functional and convenient when a large size wall-surface flower bed structure is formed, it is difficult to change locations of the plants displayed as a wall-surface flower bed and is not appropriate to make a small scale wall-surface flower bed with detailed design.

The present invention is conceived in view of issues such as those mentioned above and has as a first objective to provide a wall-surface flower bed structure that makes it possible for work efficiency to be better, root damage when plants are transferred to be prevented, and the designability to be improved in the wall-surface flower pot structure. Furthermore, the present invention has as another objective to provide a method for forming wall-surface flower bed utilizing the wall-surface flower pot structure.

DISCLOSURE OF INVENTION

In order to solve the aforementioned issues, the wall-surface flower bed structure in the present invention is a wall-surface flower bed structure to set plants along wall-surface of buildings or wall-surface of architectures, the wall-surface flower bed structure comprising: a plant-holding pot operable to hold a plant, a plurality of through holes for water passage being formed in a bottom surface and side surface thereof, and the root section of the plant being covered with a water-permeable material that allows permeation of water; a box body that has an inclined section for the placement of a plurality of the plant-holding pot, a water-collecting section which can collect water at the lower end side of the inclined section and have a recessed portion, and a water outlet for discharging water that is not collected in the water-collecting section, wherein the box body has a plurality of insertion holes for attaching to wall-surface of buildings or wall-surface of architectures with fixing tools being formed in a back side, and also has a plurality of insertion holes for connecting to other box bodies with fixing tools horizontally or for connecting to an outer frame body which allows multiple installation of the box body vertically in multiple rows with fixing tools being formed in left and right sides.

The wall-surface flower bed structure is further comprising: a water supply string operable to connect the water-collecting section and the water-permeable material, wherein the water supply string sucks up water from the water-collecting section to the water-permeable material.

The outer frame body is attached to wall-surface of buildings or to wall-surface of architectures.

Moreover, in order to solve the aforementioned issues, the method for forming wall-surface flower bed in the present invention is a method for forming wall-surface flower bed, the method comprising: a step of covering the root section of a plant with a water-permeable material that allows permeation of water; a step of inserting plants covered with the water-permeable material into a plant-holding pot; a step of installing a plurality of the plant-holding pots in the box body 2, where the box body that has an opened upper surface and has an inclined section for the placement of a plurality of the plant-holding pot, a water-collecting section which can collect water at the lower end side of the inclined section and have a recessed portion, and a water outlet for discharging water that is not collected in the water-collecting section; wherein the box body has a plurality of insertion holes for attaching to wall-surface of buildings or wall-surface of architectures with fixing tools being formed in a back side, and also has a plurality of insertion holes for connecting to other box bodies with fixing tools horizontally or for connecting to an outer frame body which allows multiple installation of the box body vertically in multiple rows with fixing tools being formed in left and right sides.

The method for forming wall-surface flower bed is further comprising: a step of displaying the box body in the outer frame body, which allows multiple installation of the box body vertically in multiple rows, wherein the box body can be connected horizontally with fixing tools; a step of attaching the outer frame body to wall-surface of buildings or to wall-surface of architectures.

The method for forming wall-surface flower bed is further comprising: a water supply string operable to connect the water-collecting section and the water-permeable material, wherein the water supply string sucks up water from the water-collecting section to the water-permeable material.

Accordingly, the wall-surface flower bed structure, according to the present invention, is provided with a box body that has an opened upper surface and has an inclined section for the placement of a plurality of the plant-holding pot, a water-collecting section for collecting water at the lower end side of the inclined section, and a water outlet for discharging water that is not collected in the water-collecting section, wherein plants being covered with a water-permeable material are placed in the box body. In this manner, the present invention makes it possible for work efficiency to be better, root damage when plants are transferred to be prevented, and the designability to be improved in the wall-surface flower pot structure.

BRIEF DESCRIPTION OF THE DRAWINGS

The present invention will be described hereinafter with reference to the annexed drawing. It is to be noted that the drawing is shown for the purpose of illustrating the technical concepts of the present invention or embodiments thereof, wherein.

DETAILED DESCRIPTION OF THE INVENTION

Embodiments of the present invention, as best mode for carrying out the invention, will be described hereinafter with reference to the drawing. It is to be understood that the embodiments described herein are not intended as limiting, or encompassing the entire scope of, the present invention.

Embodiment

Figure 1:
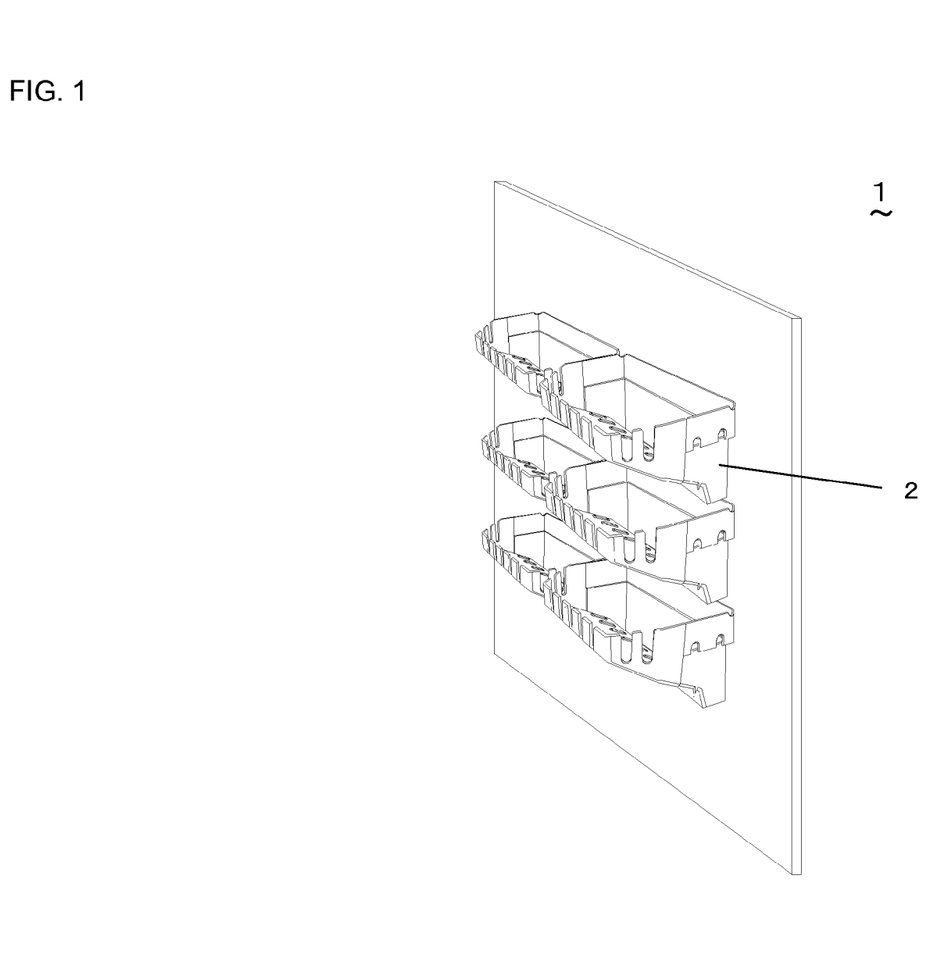
FIG. 1 is a perspective view of a wall-surface flower bed structure according to an embodiment of the present invention.

Referring to FIG. 1 to FIG. 10, a wall-surface flower bed structure, according to Embodiment 1 of the present invention will be described. FIG. 1 shows the wall-surface flower bed structure 1 for displaying plants (wall-surface greening) along wall-surface of buildings or wall-surface of architectures such as concrete buildings and temporary scaffoldings. These days, such a wall-surface greening is becoming popular, and has lots of effects, such as healing and relaxation being surrounded by green, not to mention, an energy-saving effect, reducing heat-island phenomena and avoiding the deterioration of buildings by UV irradiation.

Figure 2:
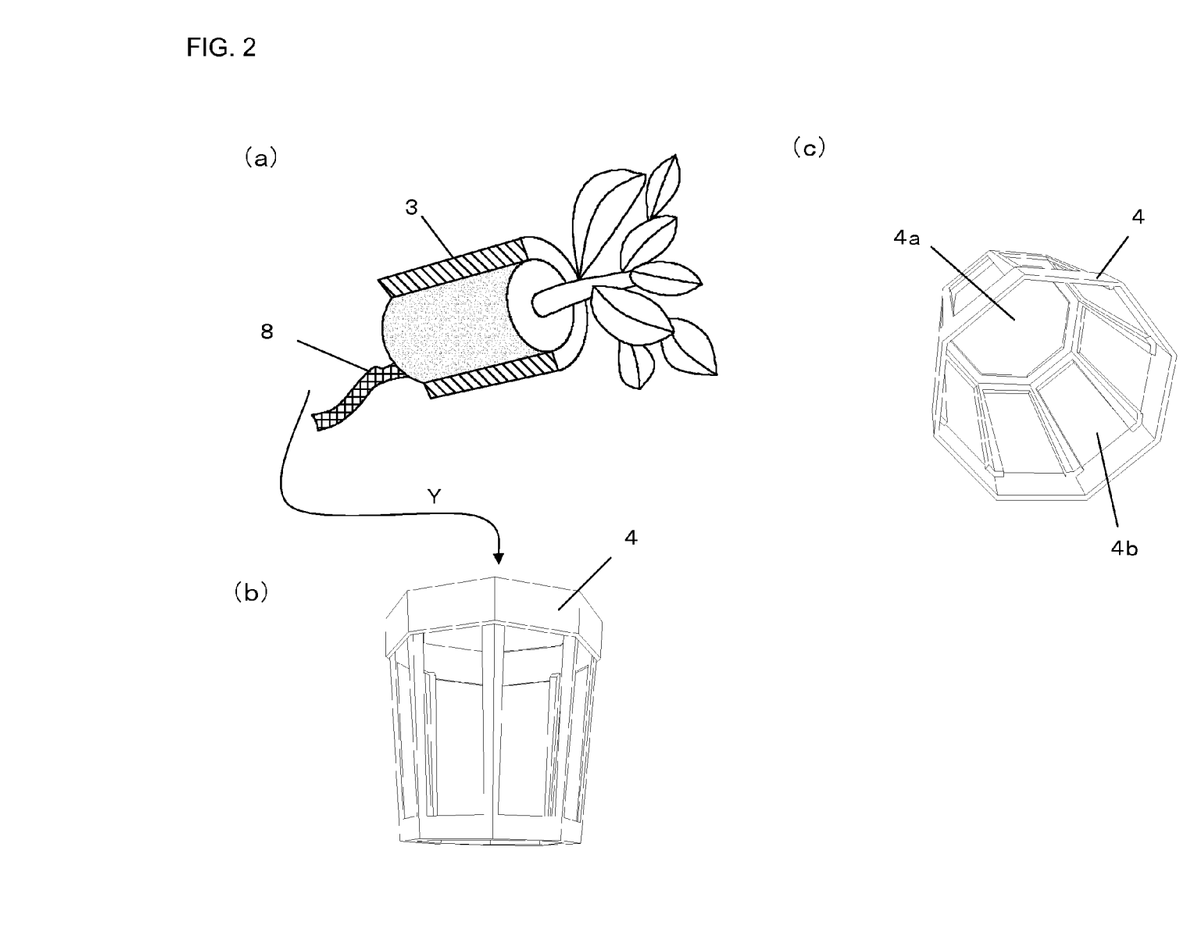
FIG. 2A is a using state view of a water-permeable material, which is used for the wall-surface flower bed structure.
FIG. 2B and FIG. 2C is a perspective view of a plant-holding pot, which is used for the wall-surface flower bed structure.

The wall-surface flower bed structure 1 has a plurality of box body 2 to place a plant. Furthermore, as shown in FIG. 2, the root section of a plant is covered with a water-permeable material 3 that allows permeation of water, and subsequently is inserted in a plant-holding pot 4 according to the direction by an arrow Y. The water-permeable material 3 is exemplified by urethane form, which has a sponge shape with thickness 1~2 cm.

As shown in FIG. 2B and FIG. 2C, the plant-holding pot 4 has a plurality of through holes 4a, 4b for passing water being formed in a bottom surface and side surface. In FIG. 2, the plant-holding pot 4 has an upper part opening of a regular octagonal shape, a plurality of though holes 4a, each of which is a regular octagonal shape in a side surface, and a plurality of though holes 4b, each of which is a regular octagonal shape in a bottom surface.

Meanwhile, the planting method, which covers the root section of a plant with a water-permeable material or a sponge form, is already widespread in hydroponics and so on. And, in the case of using plants, the root section of a plant is often covered with a sponge material to prevent culture soil from being scattered. However, in this case, there is a possibility that contact points between the root hair of the root section and the sponge material or culture soil move a little so that the balance between new root hairs and culture soil may be ruined.

On the other hand, referring to FIG. 2, the wall-surface flower bed structure 1 according to Embodiment 1 of the present invention needs the steps for covering the root section of a plant with a water-permeable material 3, then for inserting the plant in the plant-holding pot 4, and then for bringing the plant-holding pot 4 in site and decorating. Therefore, the wall-surface flower bed structure 1 can prevent plants from having stress by being moved the contact points between root hairs and sponge material or culture soil. As a result, not only to lose the balance between new root hairs and culture soil, but also to take a few days to recover from stress is avoidable.

Figure 3:
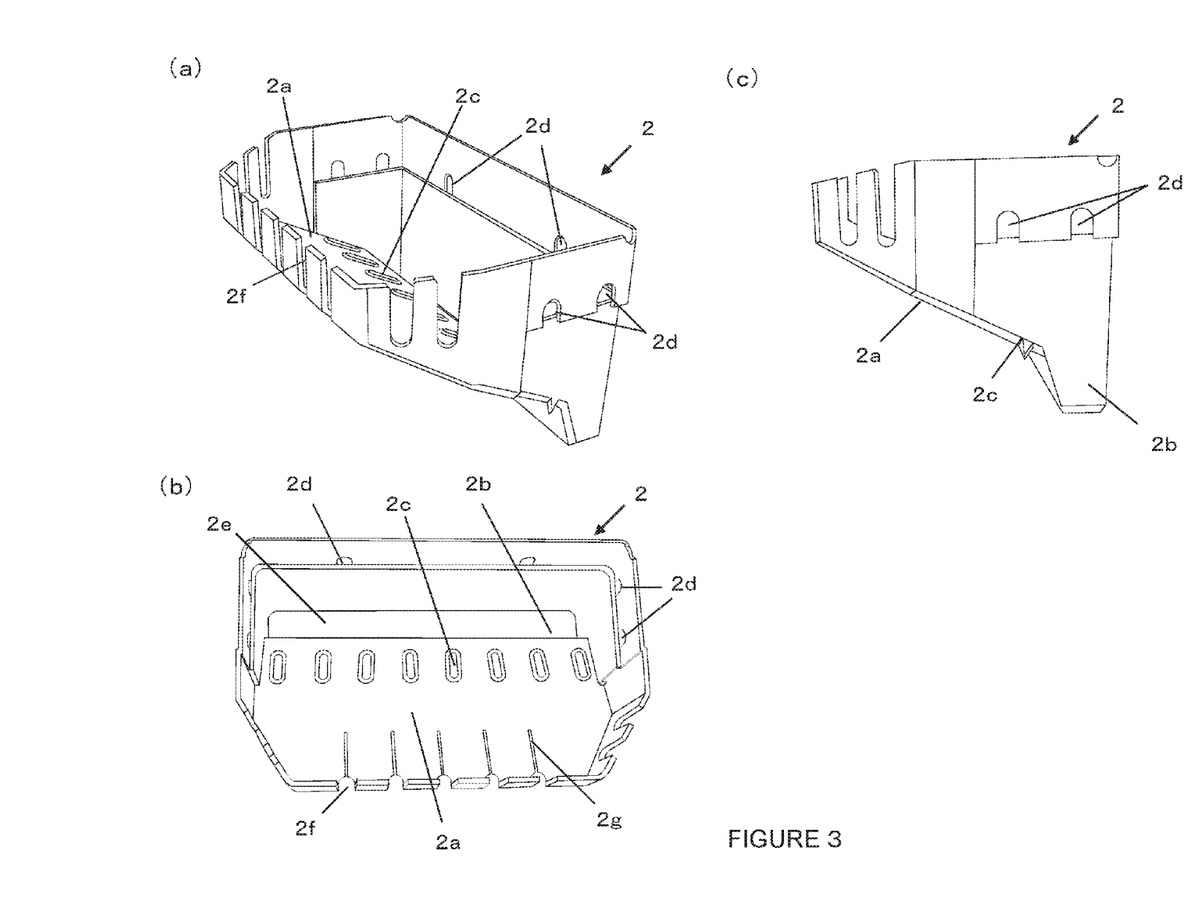
FIG. 3A is a perspective view of a box body, which is used for the wall-surface flower bed structure.
FIG. 3B is a top view of the box body.
FIG. 3C is a side view of the box body.

Hereinafter, referring to FIG. 3, a box body 2 that hold a plurality of the plant-holding pot 4 will be described. The box body 2 that has an opened upper surface and has an inclined section 2a for the placement of a plurality of the plant-holding pot 4, a water-collecting section 2b for collecting water at the lower end side of the inclined section 2a and has a recessed portion 2e, and a water outlet 2c for discharging water that is not collected in the water-collecting section 2b. The box body 2 also has a plurality of insertion holes 2d in a back part and left and right side parts for inserting fixing tools (mentioned below). This box body 2 is formed using the resin material, and the size of the box body 2 has a height of 125 mm, a width of 248 mm and a depth of 150 mm approximately in a front view. Meanwhile, although the box body 2 in FIG. 2 has a plurality of vertically extending parallel slits 2f in a front face of the box body which extends vertically upward to the opened upper surface from an upper end of the inclined section 2a, the slits 2f being open ended along an upper edge of the front face, and in upper parts of side surfaces, these slits are not indispensable. The box body 2 further includes additional slits 2g in the inclined section 2a which extend from a bottom end of a respective one of the slits 2f toward the lower end side of the inclined section 2a. The width of each additional slit 2g is less than the width of the respective slits 2f.

Figure 4:
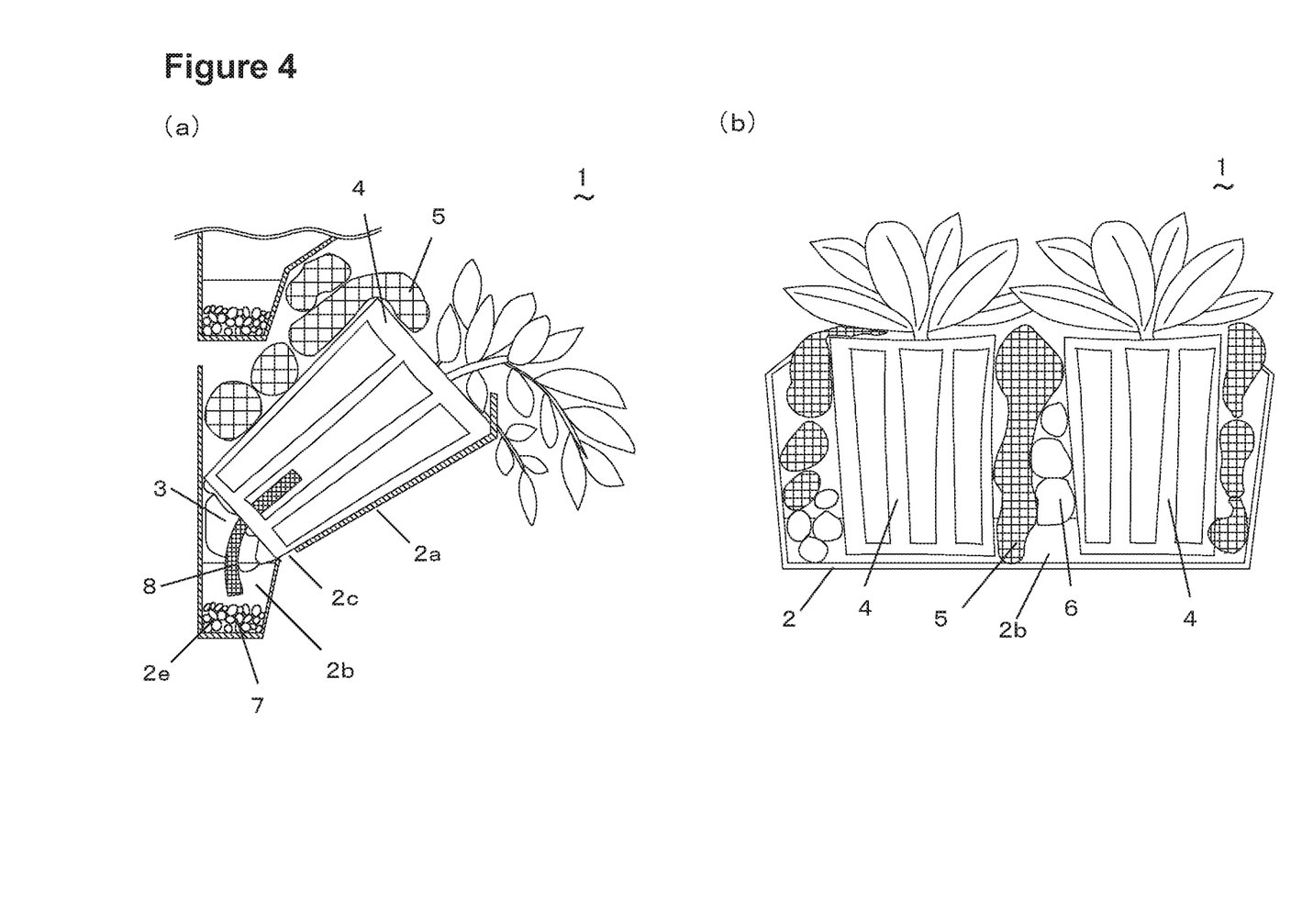
FIG. 4A and FIG. 4B is a drawing for describing using state view of the water-permeable material.
Figure 5:
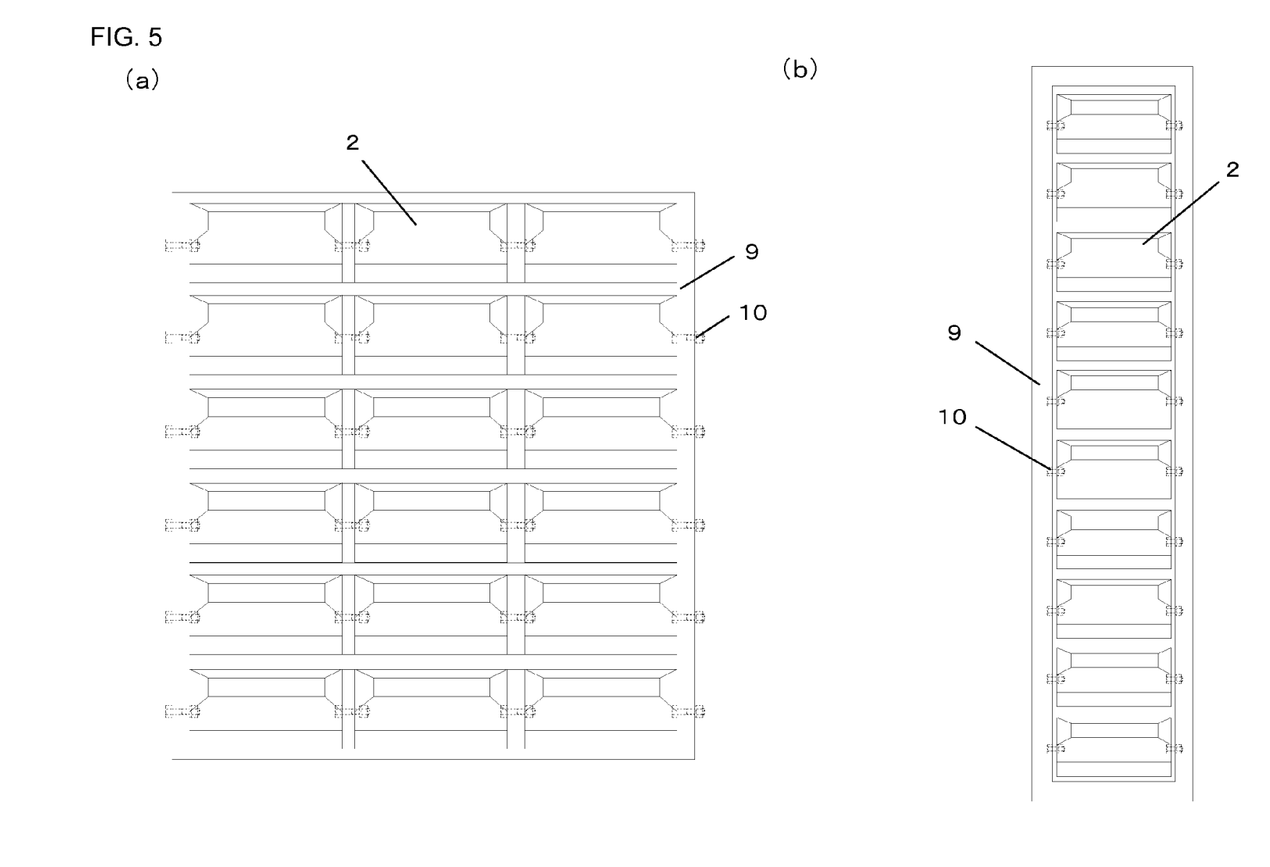
FIG. 5A is a drawing showing one example of an outer frame body, which is used for the wall-surface flower bed structure.
FIG. 5B is another example of the outer frame body.

Further, referring to FIG. 4, a plurality of the plant-holding pot 4 is installed in the box body 2 by placing side surface of the plant-holding pot 4 on the inclined section 2a. Moreover, when the plant-holding pot 4, which has already held plants such as flowers, is installed in the box body 2, it is possible to fill a sponge 5 or substances with lightweight and high in water absorption, such as a pumice 6, in the space between adjacent plant-holding pots 4, so that the water state of the root section will be retained. Furthermore, filling a silicic acids white clay 7 in the water-collecting section 2b of the box body 2 can prevent water in the water-collecting section 2b from going rotten.

Further, as shown in FIG. 4A, in order to suck up water from the water-collecting section 2b to the water-permeable material 3, a water supply string 8 can be attached to the water-permeable material 3. The material of the water supply string 8 is, for example, a non-woven fabric or a sponge, each of which has an excellent water absorption capacity or a water sucking capacity.

Normally, the water-permeable material 3 has enough capacity for allowing plants to be grown, because the water-permeable material 3 utilizing capillary phenomenon can satisfy both water sucking capacity and air permeability. However, in case where the water-permeable material 3 sucks up enough water from the water-collecting section 2b, the plants will be under over moisture condition. In particular, in case where plants are under low temperature, low growth period and over moisture, the root section of plants suffer from a suffocated state and will lead to an unhealthy state.

Therefore, in order to suck up enough water when the bottom of the plant-holding pot 4 does not touch water in the water-collecting section 2b, the water supply string 8 utilizing capillary phenomenon is being hung down from the plant-holding pot 4, wherein the water supply string 8 is dipped into water at one end. Under the circumstances, the water-permeable material 3 suck up necessary amount of water through the water supply string 8, so that plants is never in over moisture condition.

Regarding the wall-surface flower bed structure 1, the water supply string 8 is not a required constitution. In other words, it is possible to retain moderate moisture without the water supply string 8, in case where the water-permeable material 3 located in the bottom side of the plant-holding pot 4 can partly touch water in the water-collecting section 2b, or in case where the water-permeable material 3 can suck up water though a sponge which is placed between the plant-holding pot 4 and the plant-holding pot 4, wherein the sponge is a drying preventive material.

Next, a using state of the wall-surface flower bed structure 1, according to Embodiment of the present invention will be described. Referring to FIG. 1, the wall-surface flower bed structure 1 comprises the box bodies 2, which are attached directly to wall-surface of buildings or wall-surface of architectures with fixing tools. Hereinafter, referring to FIG. 5 and FIG. 6, the wall-surface flower bed structure 1 further comprises an outer frame body 9, which allows multiple installation of box bodies 2 vertically in multiple rows, wherein the box bodies 2 can be connected horizontally with fixing tools 10, such as screws and nuts, and the outer frame body 9 is attached to wall-surface of buildings or to wall-surface of architectures.

For example, as shown in FIG. 5A, in order to form a large scale wall-surface flower bed, the outer frame body 9 is made of an iron frame, wherein the outer frame body 9 is capable of fixing the box bodies 2 in three rows and six columns and each panel-shaped outer frame body 9 is attached to wall surface. Herein, the outer frame body 9 shown in FIG. 5A is made from iron, aluminum and so on. Further, FIG. 5B shows another example of the outer frame body 9, which has a vertical frame shape and is able to fix the box bodies 2 in one row and ten columns.

Figure 6:
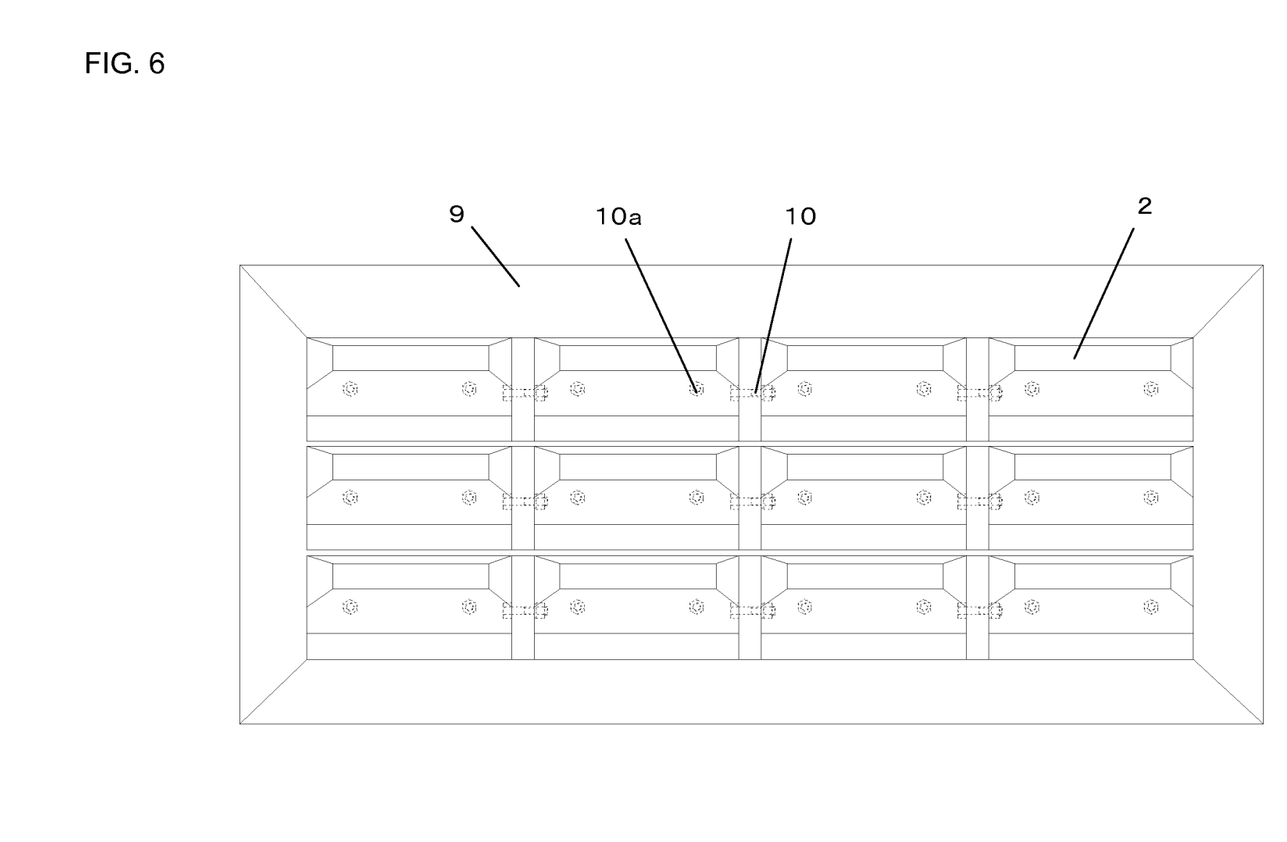
FIG. 6 is another example of the outer frame body.
Figure 7:
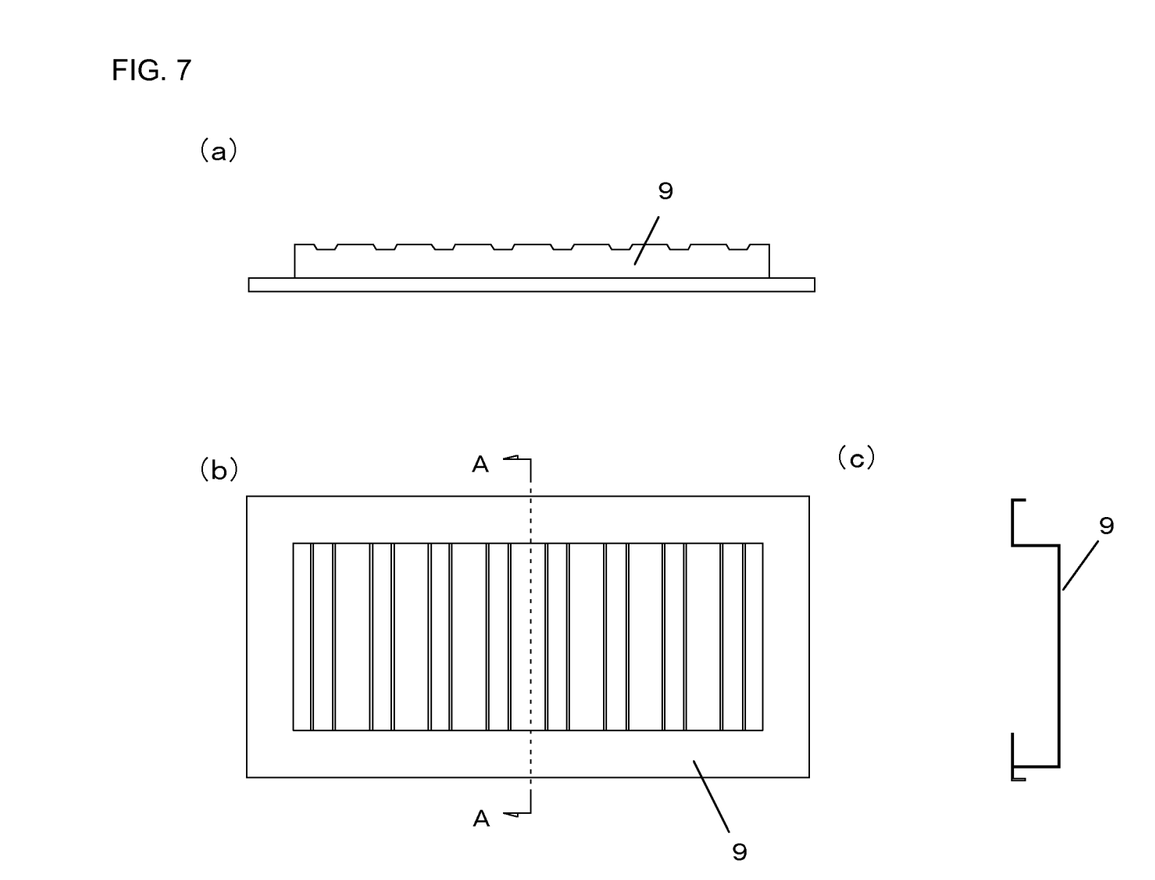
FIG. 7A is a top view of the outer frame body.
FIG. 7B is a front view of the outer frame body.
FIG. 7C is an A-A line cross section of the outer frame body.
Figure 8:
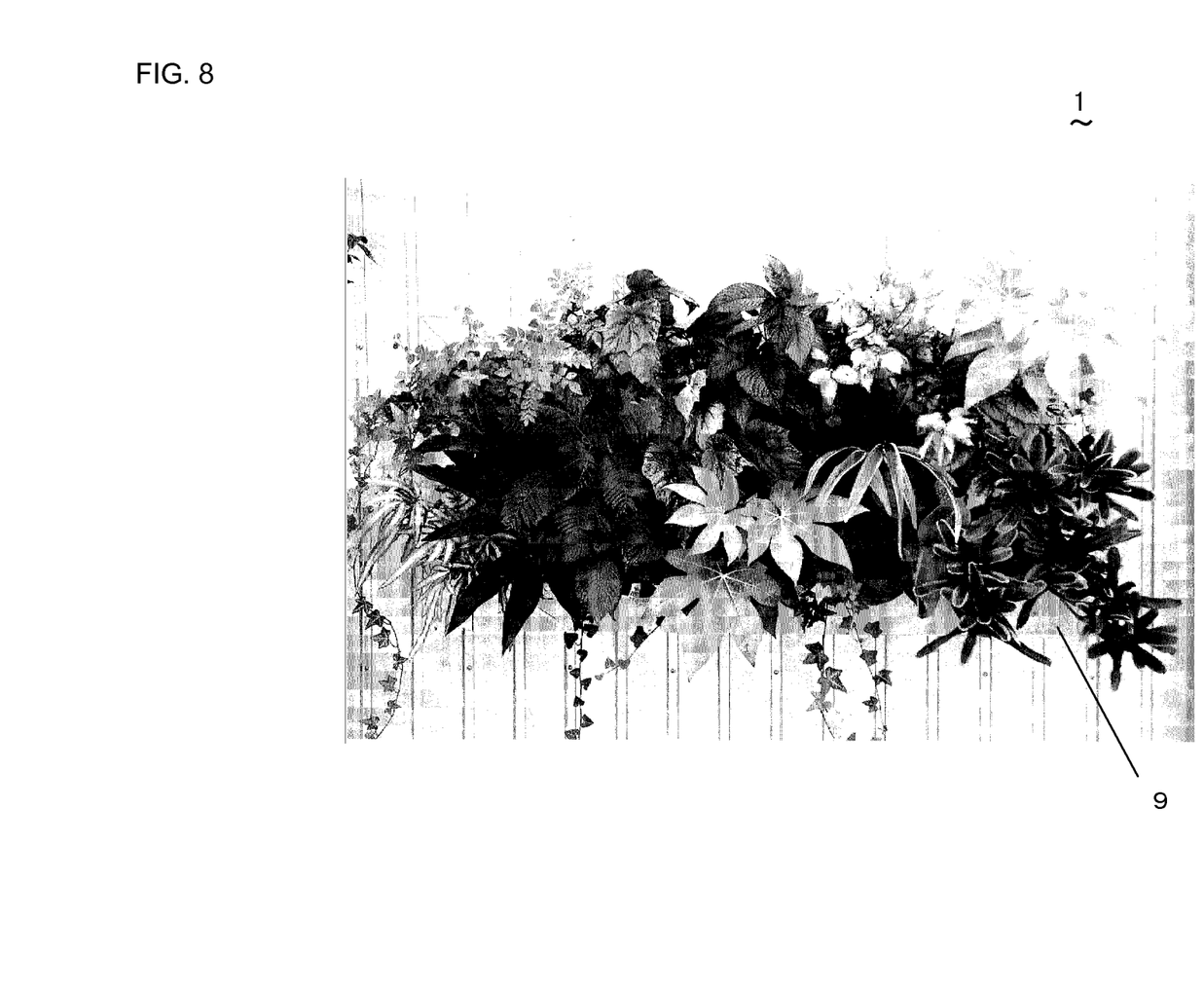
FIG. 8 is a front view of the wall-surface flower bed structure in actual state.
Figure 9:
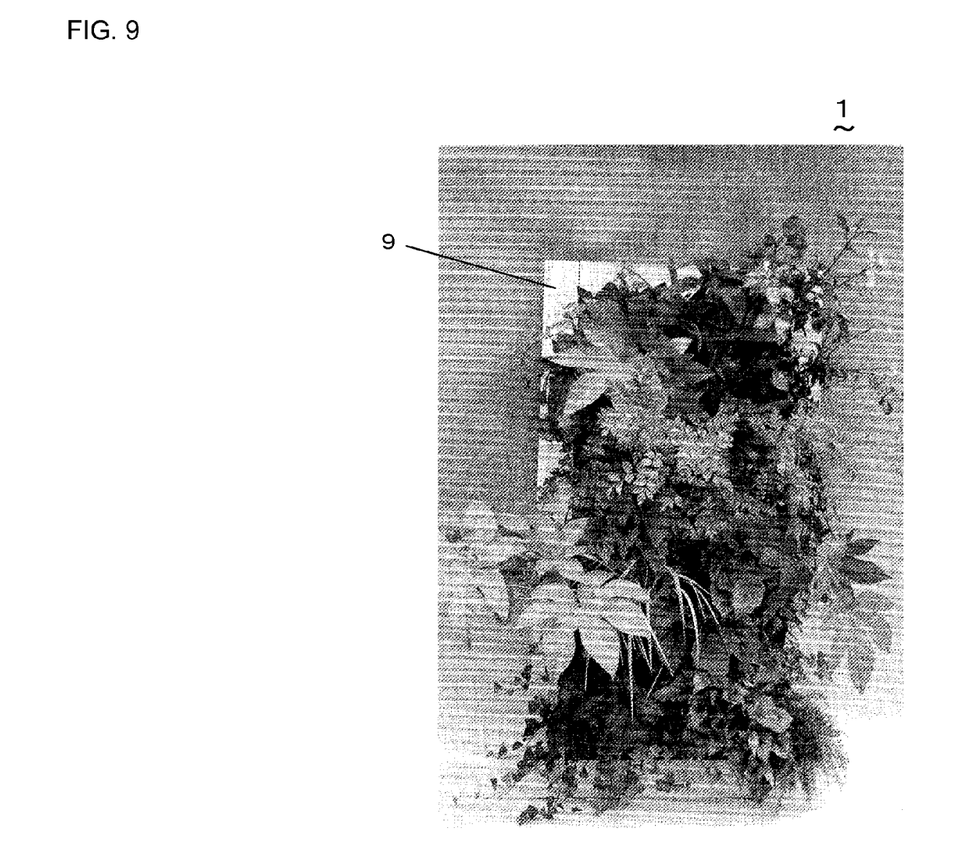
FIG. 9 is a front view of the wall-surface flower bed structure in actual state.

Furthermore, referring to FIG. 6, the wall-surface flower bed structure 1 can hold the box body 2 in four rows and three columns inside the outer frame body 9 that has a frame shape. Referring to FIGS. 7A~C, this outer frame body 9 is integrally molded by using FRP resin having a thickness of approximate 3 mm. Further, a plurality of concavo-convex shapes are formed on the back of the outer frame body 9 to prevent the head of a fixing tool 10a from protruding from the back, when the box bodies 2 are attached to the outer frame body 9 with the fixing tool 10a. Meanwhile, the outer frame body 9 is molded by aluminum, wherein the size of the outer frame body 9 has a height of 60 mm, a width of 120 mm and a depth of 10 mm approximately in a front view.

Next, a method for forming the wall-surface flower bed utilizing the wall-surface flower bed structure 1, according to Embodiment of the present invention will be described. As mentioned above, this method for forming the wall-surface flower bed comprises: a step of covering the root section of a plant with the water-permeable material 3 that allows permeation of water; a step of inserting plants covered with the water-permeable material 3 into the plant-holding pot 4; a step of installing a plurality of the plant-holding pots 4 in the box body 2. Moreover, the box body 2 is attached to wall-surface of buildings or wall-surface of architectures.

In addition, if necessary, this method for forming the wall-surface flower bed further comprises: a step of displaying the box bodies 2 in the outer frame body 9, which allows multiple installation of box bodies 2 vertically in multiple rows, wherein the box bodies 2 can be connected horizontally with fixing tools 10; a step of attaching the outer frame body 9 to wall-surface of buildings or to wall-surface of architectures.

As mentioned above, the wall-surface flower bed structure 1, according to Embodiment of the present invention includes covering the root section of the plant with the water-permeable material 3 that allows permeation of water; inserting plants covered with the water-permeable material 3 into the plant-holding pot 4; placing a plurality of the plant-holding pots 4 in the box body 2. According to these constitutions, the wall-surface flower bed structure 1 is able to improve work efficiency in case of making the wall-surface flower bed, and to prevent root damage in case of transplanting.

For example, plants, which are applicable to the wall-surface flower bed structure 1 according to Embodiment of the present invention, are held in the plant-holding pots 4 after growing at the place which provides suitable environments such as the greenhouses of farmers and after being covered root portion with the water-permeable material 3. Therefore, transplantation work in site is not necessary, and installing the plant-holding pots 4 in the box bodies 2 is necessary, as a result, this configuration makes it possible for work efficiency to be better, root damage when plants are transferred to be prevented.

Moreover, it is not efficient to exchange flowers in site, in case where the duration of flowers is over or flower is damaged for a disease, not to mention, the balance between new and old flowers gets worse when the new flowers is a seedling, as a result, the appearance is deteriorating. Because exchanging the plant-holding pots 4 is equivalent to exchanging plants in the wall-surface flower bed structure 1 according to Embodiment of the present invention, the present invention can improve work efficiency, Moreover, the wall-surface flower bed structure 1, according to Embodiment of the present invention, has more flexibility about placement of the plant-holding pots 4 due to the box body 2 that has a unique structure. Therefore, referring to FIG. 8 and FIG. 9, this configuration makes it possible for the designability to be improved incredibly in the field of a wall surface greening.

In particular, the wall-surface flower bed structure 1, according to Embodiment of the present invention, has large benefits for the plant-holding pots 4 to be moved freely in a horizontal direction, in case where the wall-surface flower bed structure 1 is implemented as small scale displays. Meanwhile, aside from the plant-holding pot 4 that holds plants, further design enhancement can be achieved by making use of empty spaces in or between the box body 2, wherein the empty spaces are filled with plants, whose root sections are covered with sponge, etc. In case of this, it is possible to realize the wall-surface flower bed structure 1 with sophisticated design.

Moreover, the wall-surface flower bed structure 1, according to Embodiment of the present invention, can realize the wall-surface flower bed with sophisticated design only by bringing plants to the event site and establishing the wall-surface flower bed structure 1 in site, wherein the plants are already grown on a farm. In particular, the most effective way can be achieved by placing plants in the wall-surface flower bed structure 1, wherein the plants is already grown on different locations during a change of season and so on.

For example, although roses usually start to bloom in the middle of May, the wall-surface flower bed structure 1 can display roses from March with low temperature on the place where frost does not occur, wherein the roses is already grown in a greenhouse. In this case, because of its low temperature, the roses can live for almost twice as long as normal roses can live, that is, the roses can live longer about one month, consequently, the wall-surface flower bed structure 1 can provide appreciators with the atmosphere that is similar to preferential seasons. Further, the same pattern is applicable to hydrangea, because hydrangea usually starts to bloom from the end of June to the beginning of July, the wall-surface flower bed structure 1 can provide appreciators with hydrangea from April or May by inserting hydrangea in the plant-holding pot 4 and by placing the plant-holding pot 4 in the box body 2, wherein hydrangea is already grown in a greenhouse.

Furthermore, for example, in terms of plants in early summer, such as impatiens and begonia, when the plants is planted in the beginning of April leaving a bit cold, it takes about one month for the plants to recover in case the plants suffer from the cold. Accordingly, after letting the plants grown in a facility before the end of April~the beginning of May until there is no late dew, the plants in full bloom can be inserted in the plant-holding pot 4, and then the plant-holding pot 4 is placed in the box body 2, so that the wall-surface flower bed structure 1 can display the plants in full bloom that is in accordance with the period of a event and so on.

Figure 10:
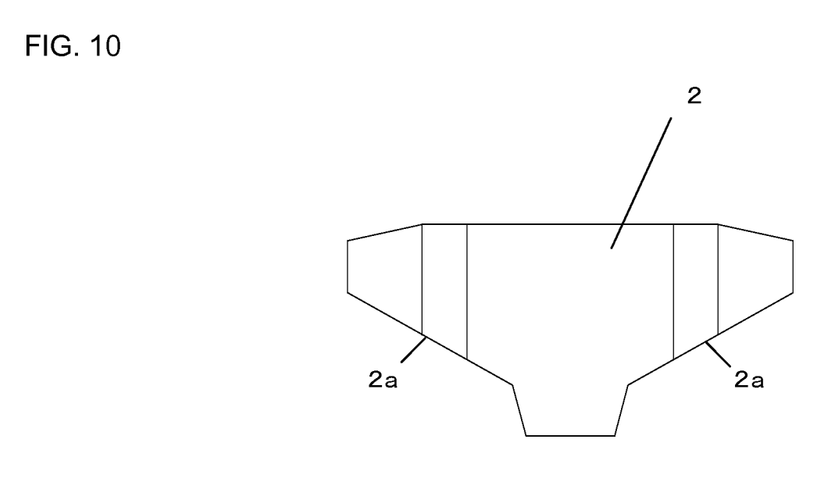
FIG. 10 is a side view of a box body having another shape.

It is to be noted that the present invention is not limited to the above-described embodiments and modified examples, and various modifications are possible within the spirit and scope of the present invention. For example, the shape of the box body 2 is not limited to the above-described embodiments, as shown in FIG. 10, this box body 2 has two inclined sections 2a and can provide beautiful design from both sides for appreciators. This application is based on Japanese patent application 2012-200906 filed Sep. 12, 2012, the content of which is hereby incorporated by reference.

The invention claimed is:

1. A wall-surface flower bed structure to set plants along a wall-surface of buildings or a wall-surface of architectures, the wall-surface flower bed structure comprising:
   a plant-holding pot operable to hold a plant, including a plurality of through holes for water passage in a bottom surface and side surface thereof, and a root section of the plant being covered with a water-permeable material that allows permeation of water; and
   a box body that has an opened upper surface, an inclined section for placement of a plurality of the plant-holding pots in a desired position, a recessed portion including a water-collecting section which can collect water at a lower end side of the inclined section, and a water outlet, which is formed near the lower end side of the inclined section, for discharging water that is not collected in the water-collecting section,
   wherein the box body has a plurality of insertion holes in a back side of the box body for attaching the box body to the wall-surface of buildings or the wall-surface of architectures with first fixing tools, and also has a plurality of insertion holes in left and right sides of the box body for connecting, with second fixing tools, the box body horizontally to other box bodies or to an outer frame body which allows installation of the box body in combination with the other box bodies in multiple rows stacked vertically, wherein a front face of the box body extends vertically upward to the opened upper surface from an upper end side of the inclined section, and includes a plurality of parallel slits extending vertically, the plurality of parallel slits being open ended along an upper edge of the front face, and wherein the inclined section includes additional slits which each extend from a bottom end of a respective one of the plurality of parallel slits toward the lower end side of the inclined section.

2. The wall-surface flower bed structure according to claim 1, further comprising:
   a water supply string operable to connect the water-collecting section and the water-permeable material,
   wherein the water supply string sucks up the collected water from the water-collecting section and delivers the water to the water-permeable material.

3. The wall-surface flower bed structure according to claim 2,
   wherein the outer frame body is attached to the wall-surface of a building or architecture.

4. The wall-surface flower bed structure according to claim 1,
   wherein the outer frame body is attached to the wall-surface of a building or architecture.

5. The wall-surface flower bed structure according to claim 1, wherein a width of each of the additional slits is less than a width of each of the plurality of parallel slits.

6. A method for forming a wall-surface flower bed, the method comprising:

a step of covering respective root sections of a plurality of plants with a water-permeable material that allows permeation of water;

a step of inserting the plants covered with the water-permeable material into respective plant-holding pots; and a step of installing the plurality of the plant-holding pots in a box body, where the box body has an opened upper surface, an inclined section for placement of the plurality of the plant-holding pots in a desired position, a recessed portion including a water-collecting section which can collect water at a lower end side of the inclined section, and a water outlet, which is formed near the lower end side of the inclined section, for discharging water that is not collected in the water-collecting section, wherein the box body has a plurality of insertion holes in a back side of the box body for attaching the box body to a wall-surface of buildings or a wall-surface of architectures with first fixing tools, and also has a plurality of insertion holes in left and right sides of the box body for connecting, with second fixing tools, the box body horizontally to other box bodies or to an outer frame body which allows installation of the box body in combination with the other box bodies in multiple rows stacked vertically, wherein a front face of the box body extends vertically upward to the opened upper surface from an upper end side of the inclined section, and includes a plurality of parallel slits extending vertically, the plurality of parallel slits being open ended along an upper edge of the front face, and wherein the inclined section includes additional slits which each extend from a bottom end of a respective one of the plurality of parallel slits toward the lower end side of the inclined section.

7. The method for forming wall-surface flower bed according to claim 6, further comprising:

a step of connecting the box body to the outer frame body; and a step of attaching the outer frame body to the wall-surface of buildings or to the wall-surface of architectures.

8. The method for forming wall-surface flower bed according to claim 7, further comprising:

a water supply string operable to connect the water-collecting section and the water-permeable material, wherein the water supply string sucks up the collected water from the water-collecting section and delivers the water to the water-permeable material.

9. The method for forming wall-surface flower bed according to claim 6, further comprising:

a water supply string operable to connect the water-collecting section and the water-permeable material, wherein the water supply string sucks up the collected water from the water-collecting section and delivers the water to the water-permeable material.

10. The method of claim 6, wherein a width of each of the additional slits is less than a width of each of the plurality of parallel slits.

* * * * *